US009317026B2

(12) United States Patent
Shiel (10) Patent No.: US 9,317,026 B2
(45) Date of Patent: Apr. 19, 2016

(54) METHOD FOR DETERMINING THE UNIQUE NATURAL THERMAL LAG (NTL) OF A BUILDING

(71) Applicant: Patrick Andrew Shiel, Dublin (IE)

(72) Inventor: Patrick Andrew Shiel, Dublin (IE)

(*) Notice: Subject to any disclaimer, the term of this patent is extended or adjusted under 35 U.S.C. 154(b) by 0 days.

(21) Appl. No.: 14/606,989

(22) Filed: Jan. 27, 2015

(65) Prior Publication Data

US 2015/0198961 A1 Jul. 16, 2015

Related U.S. Application Data

(63) Continuation-in-part of application No. 13/906,822, filed on May 31, 2013, now Pat. No. 8,977,405.

(51) Int. Cl.
| | | |
|---|---|---|
| *G05D 3/12* | (2006.01) | |
| *G05B 15/02* | (2006.01) | |
| *G05B 13/04* | (2006.01) | |
| *G06F 17/18* | (2006.01) | |
| *F24D 19/10* | (2006.01) | |
| *G06Q 10/04* | (2012.01) | |
| *G06Q 10/06* | (2012.01) | |
| *G06Q 50/06* | (2012.01) | |
| *G06Q 50/16* | (2012.01) | |
| *F24F 11/00* | (2006.01) | |
| *G06F 17/50* | (2006.01) | |

(52) U.S. Cl.
CPC ............ *G05B 15/02* (2013.01); *F24D 19/1081* (2013.01); *G05B 13/04* (2013.01); *G06F 17/18* (2013.01); *G06Q 10/04* (2013.01); *G06Q 10/06* (2013.01); *G06Q 50/06* (2013.01); *G06Q 50/16* (2013.01); *F24F 2011/0047* (2013.01); *F24F 2011/0058* (2013.01); *F24F 2011/0075* (2013.01); *G06F 17/5004* (2013.01); *G06F 17/5009* (2013.01); *G06F 2217/80* (2013.01)

(58) Field of Classification Search
CPC ............... G06Q 10/04; H02J 2003/007; H02J 2003/003; G05B 2219/42001; Y02B 70/3225; Y02B 60/144; Y02B 70/3241
See application file for complete search history.

(56) References Cited

U.S. PATENT DOCUMENTS

| | | | | |
|---|---|---|---|---|
| 2009/0204267 A1* | 8/2009 | Sustaeta | ............ | G05B 13/0285 700/291 |
| 2011/0130886 A1* | 6/2011 | Drees | ..................... | G05B 15/02 700/291 |
| 2011/0153103 A1* | 6/2011 | Brown | .................. | G06Q 10/04 700/291 |
| 2011/0160927 A1* | 6/2011 | Wilson | .................... | G06Q 10/04 700/291 |
| 2012/0010757 A1* | 1/2012 | Francino | ................ | G05B 15/02 700/291 |
| 2012/0022700 A1* | 1/2012 | Drees | ..................... | G05B 15/02 700/276 |
| 2012/0101648 A1* | 4/2012 | Federspiel | ......... | G05D 23/1934 700/291 |
| 2012/0232701 A1* | 9/2012 | Carty | ..................... | G05B 15/02 700/277 |

* cited by examiner

*Primary Examiner* — Darrin Dunn

(57) ABSTRACT

The invention provides an improved method for determining the natural thermal lag (NTL) of a building, where the improvement includes using the 15 minute interval energy usage data for the building, and data the external temperature to determine the NTL. This improved method has the advantage of being independent of any need to acquire data regarding internal temperature of the building in question.

1 Claim, 8 Drawing Sheets

P1 average external temperature To (line) and the corresponding NTL values (dots)
July 2012 to August 2013

P1 average external temperature To (line) and the corresponding NTL values (dots)
July 2012 to August 2013

Figure 1

| P1 Heat 2012/2013 | Tout 8H Lag 0000-1000 | Tout 7H Lag 0100-1100 | Tout 6H Lag 0200-1200 | Tout 5H Lag 0300-1300 | Tout 4H Lag 0400-1400 | Tout 3H Lag 0500-1500 | Tout 2H Lag 0600-1600 | Tout 1H Lag 0700-1700 | Tout 0H Lag 0800-1800 |
|---|---|---|---|---|---|---|---|---|---|
| R-Sq (%) | 87.7 | 89.8 | 92.1 | 93.5 | 94.1 | 93.7 | 92.2 | 90.0 | 87.9 |
| RMSE (kWh) | 39.0 | 35.4 | 31.3 | 28.4 | 27.0 | 28.0 | 31.0 | 35.2 | 38.8 |
| CV(RMSE) (%) | 10.2 | 9.3 | 8.2 | 7.5 | 7.1 | 7.4 | 8.1 | 9.2 | 10.2 |

Table 1 Single linear regression of P1 heat energy versus 0 to 8 hour lagged external temperature indices with corresponding values of R-Sq, Variance (RMSE) and the Coefficient of Variation of RMSE

Figure 2

| P1 Cooling 2013 | Tout 8H Lag 0000-1000 | Tout 7H Lag 0100-1100 | Tout 6H Lag 0200-1200 | Tout 5H Lag 0300-1300 | Tout 4H Lag 0400-1400 | Tout 3H Lag 0500-1500 | Tout 2H Lag 0600-1600 | Tout 1H Lag 0700-1700 | Tout 0H Lag 0800-1800 |
|---|---|---|---|---|---|---|---|---|---|
| R-Sq (%) | 89.7 | 90.7 | 91.1 | 90.4 | 88.5 | 86.2 | 82.8 | 79.3 | 77.5 |
| RMSE (kWh) | 6.55 | 6.22 | 6.12 | 6.32 | 6.94 | 7.60 | 8.47 | 9.30 | 9.71 |
| CV(RMSE) (%) | 12.4 | 11.8 | 11.6 | 12.0 | 13.2 | 14.4 | 16.1 | 17.7 | 18.4 |

Table 2 Single linear regression of P1 cooling energy versus the 0 to 8 hour lagged external temperature indices with corresponding values of R-Sq, Variance (RMSE) and Coefficient of Variation of RMSE

Figure 3

External temperature (dotted), internal space temperature in P1 while the building is at rest (solid) and the desired space temperature set-point (dashed)

Figure 4

T1 average external temperatures (line) versus lag period count (dots) from September 1st, 2012 to August 18th, 2013

Figure 5

| T1 Heat 2012/2013 | 8 Avg Daily T 0000-1000 | 7 Avg Daily T 0100-1100 | 6 Avg Daily T 0200-1200 | 5 Avg Daily T 0300-1300 | 4 Avg Daily T 0400-1400 | 3 Avg Daily T 0500-1500 | 2 Avg Daily T 0600-1600 | 1 Avg Daily T 0700-1700 | 0 Avg Daily T 0800-1800 |
|---|---|---|---|---|---|---|---|---|---|
| R-Sq (%) | 72.0% | 75.9% | 79.9% | 83.5% | 86.8% | 89.6% | 91.9% | 93.2% | 93.7% |
| RMSE (kWh) | 648.9 | 602.9 | 550.4 | 498.0 | 446.4 | 395.0 | 348.3 | 320.9 | 309.0 |
| CV(RMSE) (%) | 20.9 | 19.4 | 17.7 | 16.1 | 14.4 | 12.7 | 11.2 | 10.3 | 9.96 |

Table 3 T1 heat energy regressed against each of the lagged external temperature indices (8 hours to 0 hours) and the R-Sq, RMSE and CV(RMSE) results, with the best result highlighted

Figure 6

| T1 Cooling 2013 | 8 Avg Daily T 0000-1000 | 7 Avg Daily T 0100-1100 | 6 Avg Daily T 0200-1200 | 5 Avg Daily T 0300-1300 | 4 Avg Daily T 0400-1400 | 3 Avg Daily T 0500-1500 | 2 Avg Daily T 0600-1600 | 1 Avg Daily T 0700-1700 | 0 Avg Daily T 0800-1700 |
|---|---|---|---|---|---|---|---|---|---|
| R-Sq (%) | 73.7% | 78.3% | 82.6% | 86.4% | 88.6% | 89.1% | 88.4% | 87.0% | 85.9% |
| RMSE (kWh) | 897 | 814 | 729 | 645 | 591 | 578 | 596 | 632 | 656 |
| CV(RMSE) (%) | 14.2 | 12.9 | 11.6 | 10.2 | 9.4 | 9.2 | 9.5 | 10.0 | 10.4 |

Table 4 T1 cooling energy regressed against each of the lagged external temperature indices (8 hours to 0 hours) and the R-Sq, RMSE, and CV(RMSE) results, with the best result highlighted

Figure 7

| T2 Cooling 2013 | 8 Avg Daily T 0000-1000 | 7 Avg Daily T 0100-1100 | 6 Avg Daily T 0200-1200 | 5 Avg Daily T 0300-1300 | 4 Avg Daily T 0400-1400 | 3 Avg Daily T 0500-1500 | 2 Avg Daily T 0600-1600 | 1 Avg Daily T 0700-1700 | 0 Avg Daily T 0800-1700 |
|---|---|---|---|---|---|---|---|---|---|
| R-Sq (%) | 70.2 | 73.1 | 76.2 | 79.2 | 81.9 | 84.2 | 86.0 | 87.2 | 87.6 |
| RMSE (kWh) | 59.3 | 56.4 | 53.0 | 49.6 | 46.2 | 43.2 | 40.7 | 39.0 | 38.3 |
| CV(RMSE) (%) | 11.7 | 11.1 | 10.5 | 9.8 | 9.1 | 8.5 | 8.1 | 7.7 | 7.6 |

Table 5 T2 cooling energy regressed against each of the lagged external temperature indices (8 hours to 0 hours) and the R-Sq, RMSE, and CV(RMSE) results, with the best result highlighted

METHOD FOR DETERMINING THE UNIQUE NATURAL THERMAL LAG (NTL) OF A BUILDING

RELATED APPLICATIONS

This application is a continuation in part of U.S. application Ser. No. 13/906,822 by the same inventor, entitled Continuous Optimization Energy Reduction Process in Commercial Buildings, filed May 31, 2013. The entirety of application Ser. No. 13/906,822 is incorporated by reference as if fully set forth herein.

This application is also related to U.S. application Ser. No. 14/607,003, and U.S. application Ser. No. 14/607,011, each by the same inventor and each a continuation in part of U.S. Ser. No. 13/906,822, and where the entireties of each of U.S. application Ser. No. 14/607,003, and U.S. application Ser. No. 14/607,011, are incorporated by reference as if fully set forth herein.

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on the building itself and the desire to keep that building at a particular level of warmth and/or humidity.

Occupant comfort is assumed to be serviced based on generalized set of parameters and tables used by designers in specifying the building and plant within it. It has been shown over several years, that the predictive strength of these tools is not strong when comparing the design estimates of energy use with the reality, post-occupation.

BRIEF SUMMARY OF THE INVENTION

Following (U.S. application Ser. No. 13/906,822) where the derivation of a building's natural thermal lag (NTL) was explained, the current invention teaches a method of determining NTL solely using energy data. In (U.S. application Ser. No. 13/906,822), the NTL was determined by comparing internal space temperature and the corresponding external temperature. The current invention teaches that the energy usage in a building is dependent upon the NTL and therefore if the 15 minute interval energy usage data is known, along with the external temperature, the NIT can be determined without reference to any internal temperature data.

This is very useful since utility companies usually have this interval data for commercial buildings. It is unusual to find an accurate recording of one year of internal space temperatures for any building. Given the importance of the NTL in finding an accurate predictor of energy usage, this more accessible and simpler method is an improvement on the NTL derivation method explained in, (U.S. application Ser. No. 13/906,822).

BRIEF DESCRIPTION OF THE DRAWINGS

The drawings listed are provided as an aid to understanding the invention.

DETAILED DESCRIPTION OF A PREFERRED EMBODIMENT OF THE INVENTION

Introduction

Following (U.S. application Ser. No. 13/906,822), where the derivation of a building's natural thermal lag (NTL) was explained, the following is an explanation of how this NTL may be derived from energy data alone. In, (U.S. application Ser. No. 13/906,822), the NTL was determined by comparing internal space temperature and the corresponding external temperature. It will be shown in the explanation below that the energy usage in a building is dependent upon the NTL and therefore if the 15 minute interval energy usage data is known, along with the external temperature, the NTL can be determined without reference to any internal temperature data.

This is very useful since utility companies usually have this interval data for commercial buildings. It is unusual to find an accurate recording of one year of internal space temperatures for any building. Given the importance of the NTL in finding an accurate predictor of energy usage, this more accessible and simpler method is an improvement on the NTL derivation method explained in, (U.S. application Ser. No. 13/906,822).

Determination of NTL by Regression Analysis of Energy Usage and External Temperature For any given building, the method for determining the unique NTL values over a full year has been shown in U.S. application Ser. No. 13/906,822,—claim 1. This provides the theoretical background as to the existence of a unique NTL for each building with its unique plant configurations, etc. This analysis required a full year of 15 minute interval data for both internal space temperatures and external temperatures. The internal space temperatures in 15 minutes intervals can often be difficult to source from buildings where this data is not permanently logged.

Consider buildings where space heating is not required over the summer and winter cooling is required only to compensate for overheating of certain areas (poorly controlled areas). It is known from practical experience that this winter cooling load tends to be approximately constant. Since there is no need to forecast constant usage, only the variable parts of total energy usage are of interest. The total building energy usage comprising winter heating and summer cooling can be therefore split into two parts for this analysis.

Figure 1:
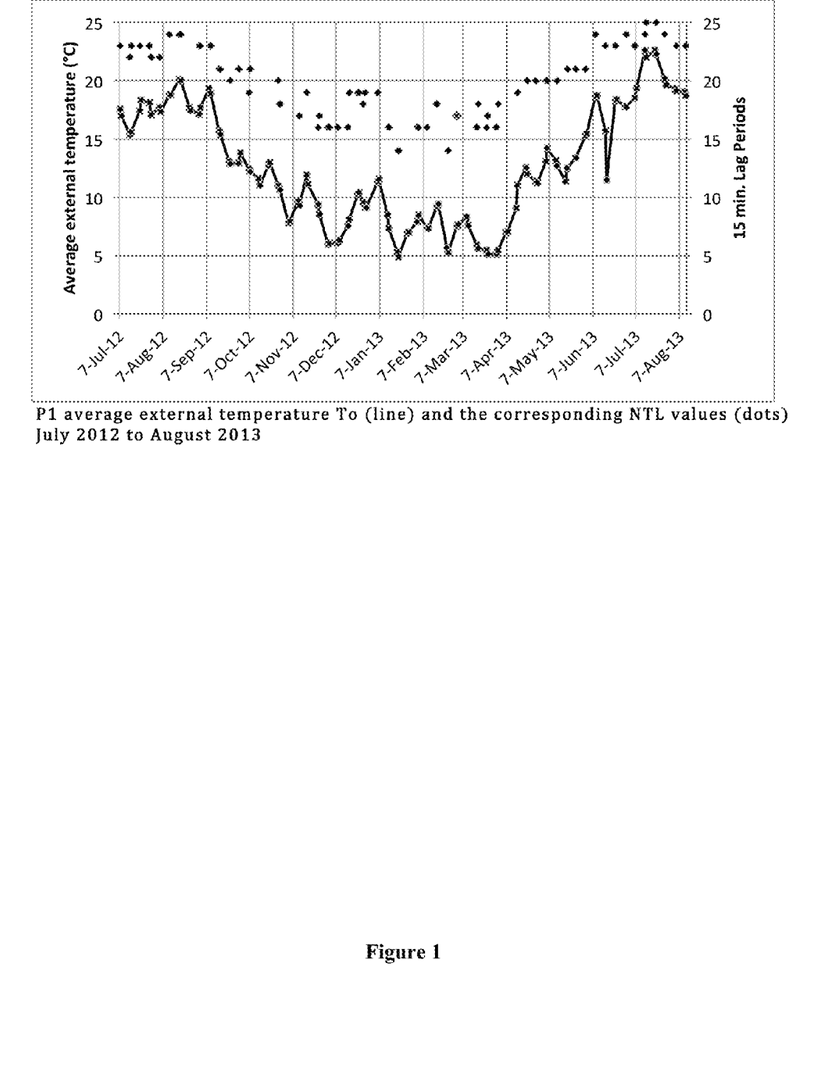
FIG. 1 shows P1 average external temperature To (line) and the corresponding NTL values (dots) July 2012 to August 2013

The example shown in FIG. 1 shows the variation of NTL with the changing external temperature over a full year. These values of NTL for any given external temperature provide guidance as to the appropriate lag to apply in forming the lagged external temperature index. This lagged external temperature index yields the strongest predictor of energy usage in a single linear regression analysis. From FIG. 1, the strongest predictor of thermal energy usage during the winter months is likely to be the 4 hour lagged external temperature index (16 lags). Likewise, for the summer, the strongest predictor of cooling energy is likely to be the 6 hour lagged external temperature index (24 lags).

Figure 2:
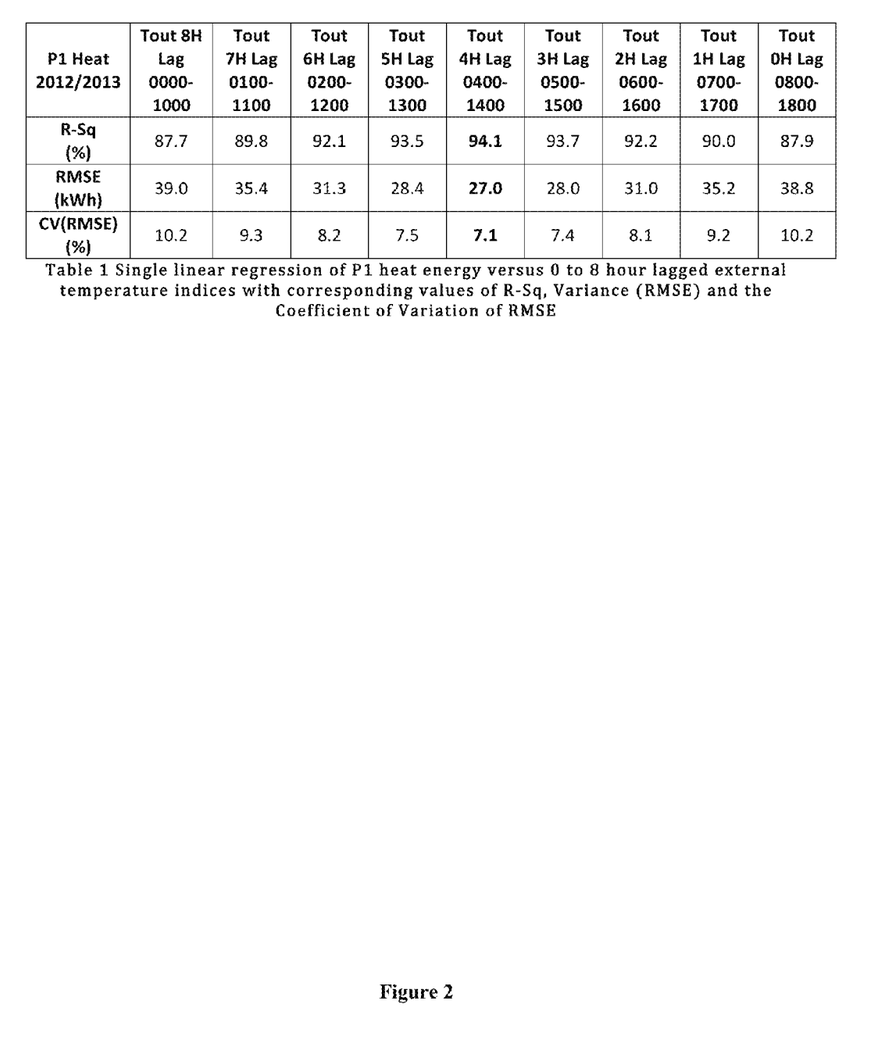
FIG. 2 shows Table 1 Single linear regression of P1 heat energy versus 0 to 8 hour lagged external temperature indices with corresponding values of R-Sq, Variance (RMSE) and the Coefficient of Variation of RMSE
Figure 3:
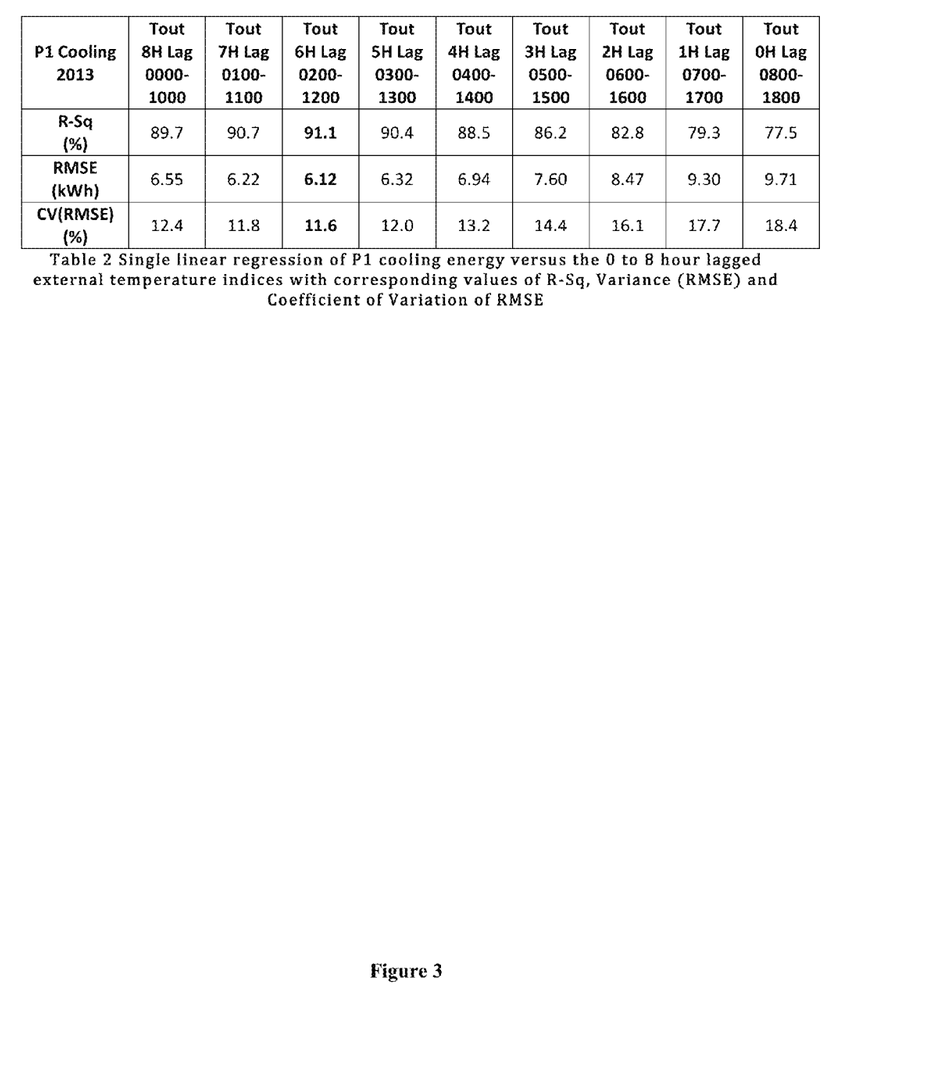
FIG. 3 shows Table 2 Single linear regression of P1 cooling energy versus the 0 to 8 hour lagged external temperature indices with corresponding values of R-Sq, Variance (RMSE) and Coefficient of Variation of RMSE
Figure 4:
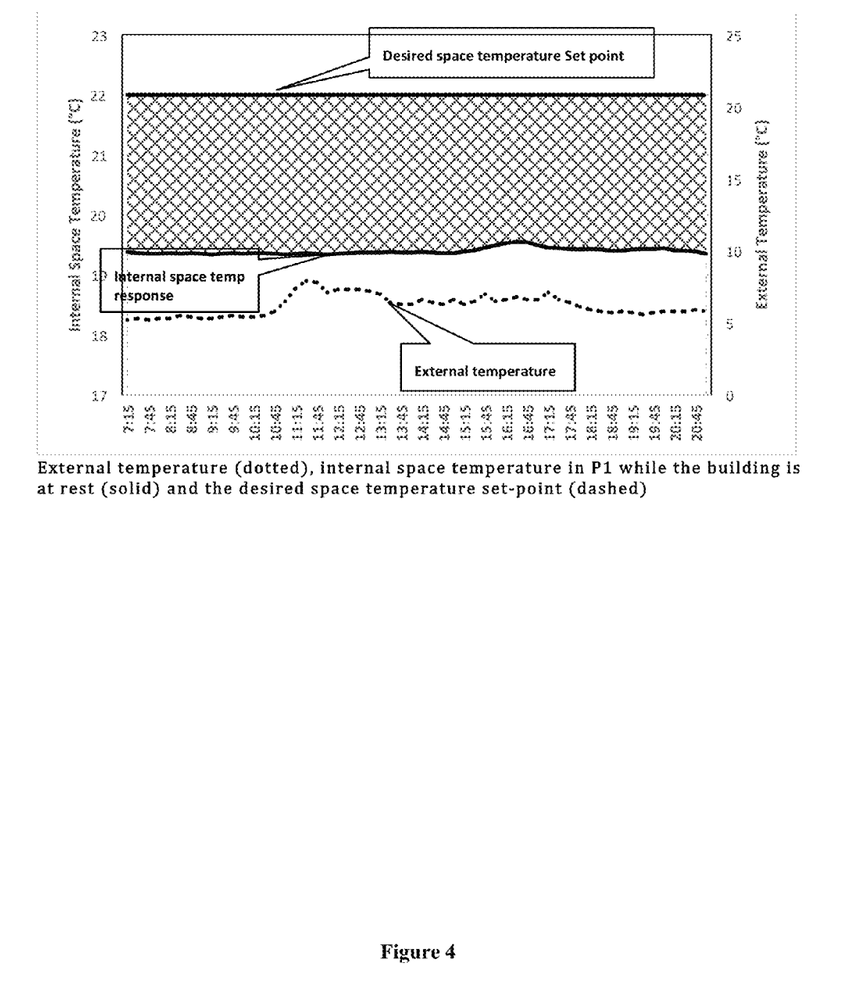
FIG. 4 shows External temperature (dotted), internal space temperature in P1 while the building is at rest (solid) and the desired space temperature set-point (dashed)
Figure 5:
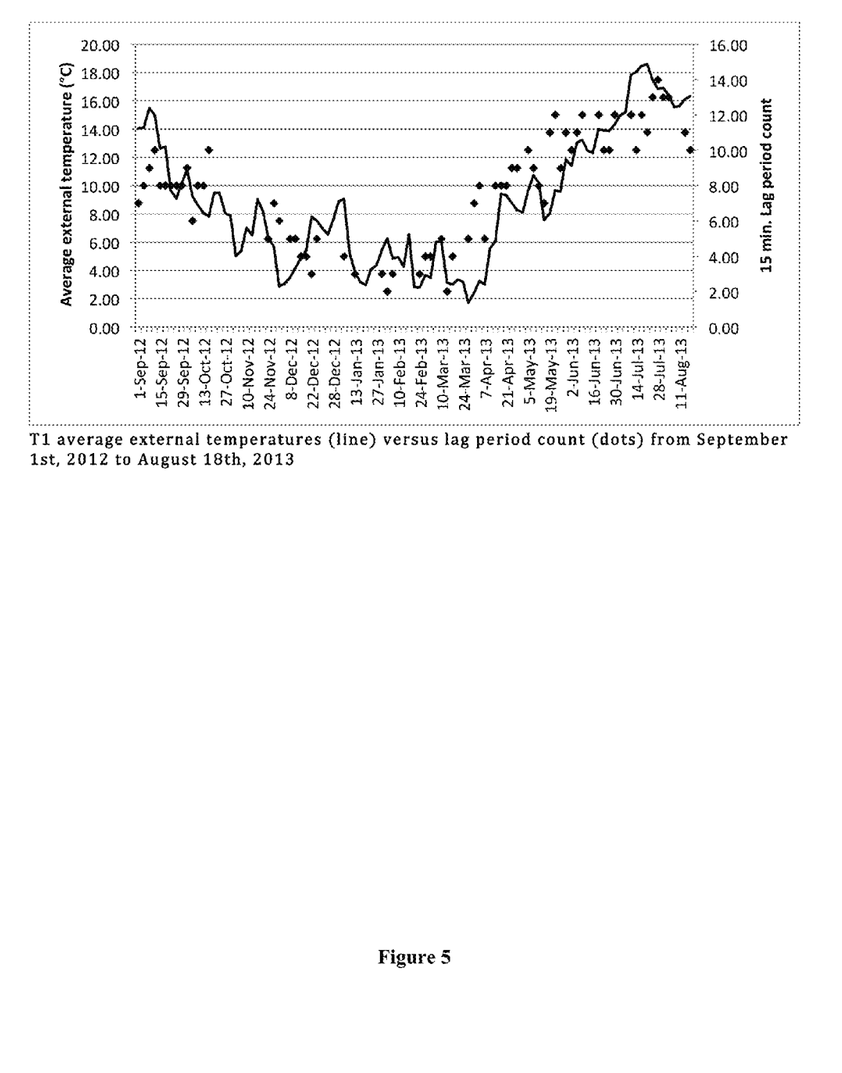
FIG. 5 shows T1 average external temperatures (line) versus lag period count (dots) from Sep. 1, 2012 to Aug. 18, 2013

To demonstrate an alternative method to show this, a range of lagged external temperature indices is generated as shown in Tables 1 and 2. These indices of external temperature are simply averages formed over the period shown in row 1 of Tables 1 and 2. Each of these indices, in turn, is regressed against the same average hourly energy usage (heating or cooling, as appropriate). The highest value of the coefficient of determination (R-Sq) and the lowest value of variance (or Root Mean Square Error (RMSE)) coincide with the appropriate NTL value observed in FIG. 1. This has been done on three buildings of widely different usage and occupancy requirements and these buildings are referred to as P1, T1 and T2 in the following charts.

In relating average hourly energy usage (thermal and electricity) to various lagged external temperature averages, the general form of equation applied to each of these three buildings is:

$$E_i = \beta_0 + \beta_1 (LT_i)_{k=0..8} + \epsilon_i \qquad \text{Eqn 1}$$

where $E_i$ represents the observed variable of average hourly thermal of electrical energy usage for said building on any chosen day, $\beta_0$ represents the intercept of the linear relationship between energy and the lagged temperature average on the y or energy axis, $\beta_1$ represents the slope of the relationship between average hourly energy usage and the lagged temperature average $(LT_i)_{k=0..8}$ for a same given day i and ranging over a period k from 0 to 8 hours prior to the building closing time, $\epsilon$ represents the error inherent in the linear model.

It is evident from Table 1 that the highest value of R-Sq and lowest values of RMSE and the Coefficient of Variation of RMSE (CV(RMSE)) occur at the 4 hour lagged external temperature index for heating in P1. This is in agreement with the derivation of the NTL in U.S. application Ser. No. 13/906, 822, claim 1. The same can be shown for this P1 building with an analysis of cooling energy over the summer and this is shown in Table 2.

Again, it can be observed from this table that the single linear regression model with the highest R-Sq, and lowest values of RMSE and CV(RMSE) correspond to the NTL value as guided by the method in U.S. application Ser. No. 13/906,822, claim 1, in this case of P1 cooling, 6 hours.

This provides a method to determine the NTL without having to know any internal space temperatures.

In order to illustrate why this should be the case, consider the following data provided in FIG. 2 which shows the desired space temperature set-point (based on Occupant Comfort standards) and the internal and external temperature profiles for a typical day (while the building is at rest).

The amount of thermal energy required to bring the internal space to desired set-point can be represented by the hatched area. The amount of energy required can be observed to depend on the level of internal temperature during the working day which in turn has been shown to depend on the external temperature which has occurred at some time in the past.

An approximation of how long in the past is provided by the NTL. The effects of the rising external temperature can be observed to influence the required thermal energy to reach set-point. Unlike P1, which is of heavy construction with a high thermal mass, a building of lightweight steel frame construction is likely to respond faster, and in a more pronounced manner, to changes in outside temperature, and therefore have a lower NTL.

In order to test the results from building P1, the process was repeated on the first test (T1) building. This building is a multi-tenant mixed use building of office and retail. The construction technique is of steel frame with lightweight curtain walling and glazing. It is expected that the T1 building is lighter when compared to P1 and therefore should exhibit a smaller NTL value in both winter and summer given the thermal losses will be higher.

The method outlined in U.S. application Ser. No. 13/906, 822, was implemented for T1 and the year-round NTL was determined as shown in FIG. 3.

Figure 6:
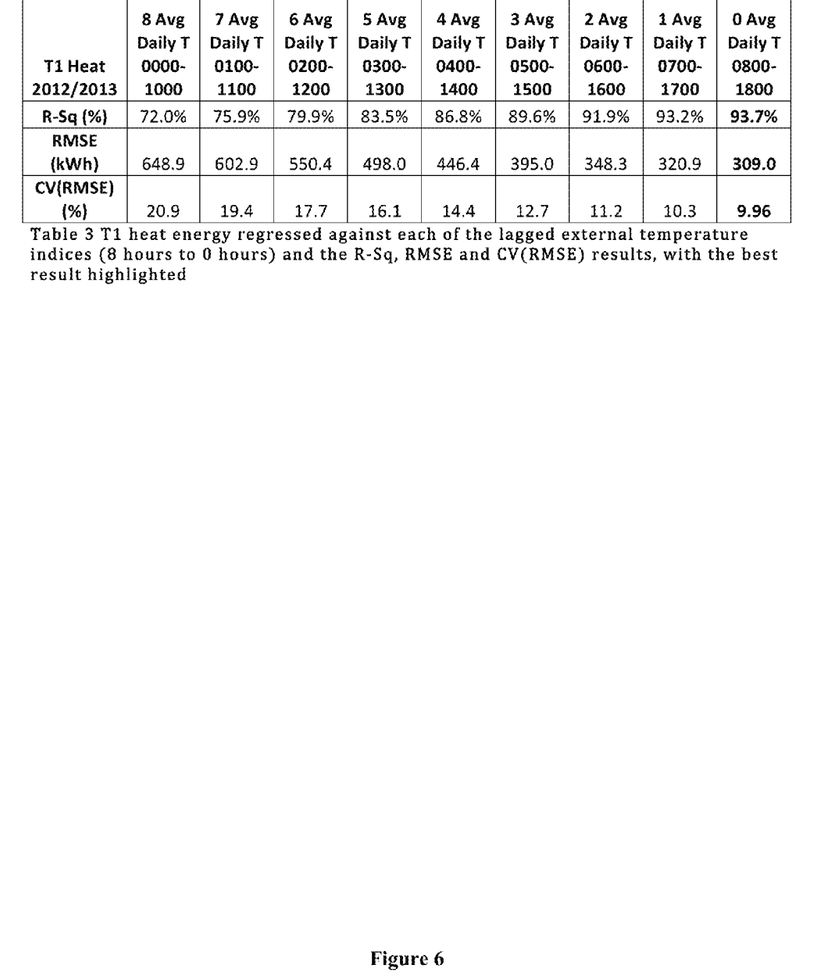
FIG. 6 shows indices (8 hours to 0 hours) and the R-Sq, RMSE and CV(RMSE) results, with the best result highlighted
Figure 7:
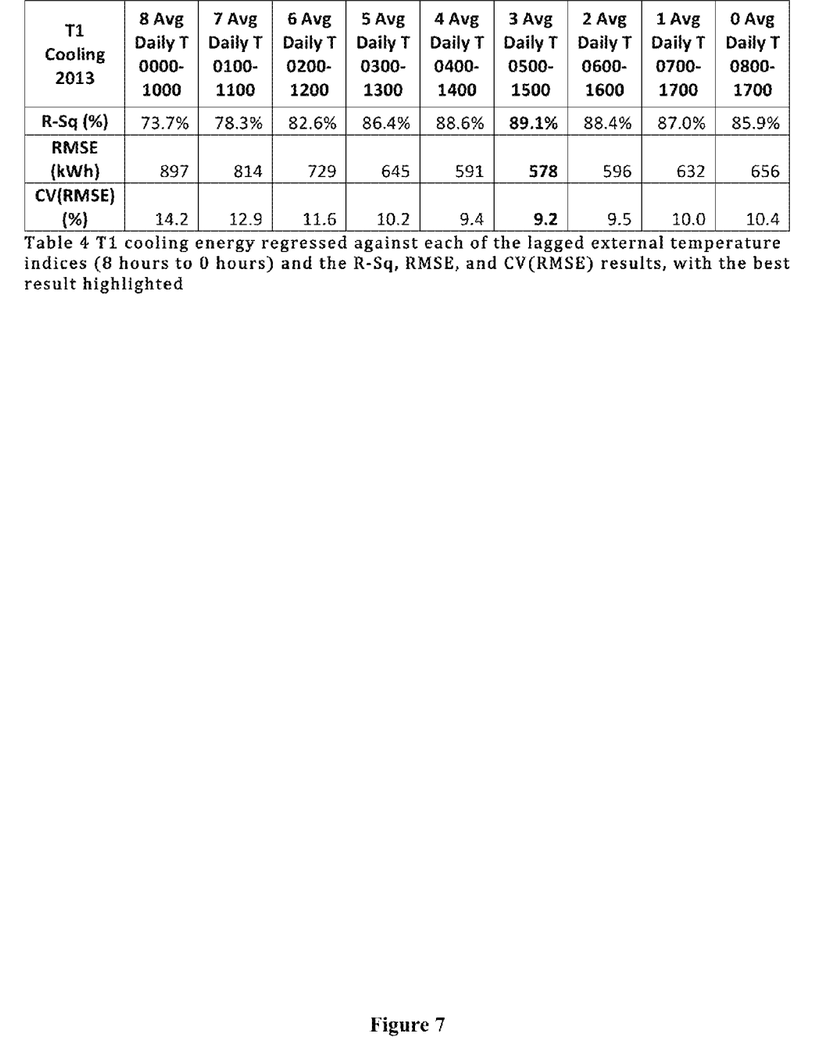
FIG. 7 shows Table 4 T1 cooling energy regressed against each of the lagged external temperature indices (8 hours to 0 hours) and the R-Sq, RMSE, and CV(RMSE) results, with the best result highlighted

The values indicate a winter NTL of between 2 and 4 lag periods or between 1 and 0 hours and a summer NTL of approximately 12 lag periods or 3 hours. As with the P1 building, the various lagged average external temperatures were generated going back 8 hours and the heating and cooling energy usage figures were regressed each lagged temperature average in turn. The results of these regressions are shown in Table 3 and Table 4.

If the hypothesis developed for building P1 is borne out, it would be expected that the heating NTL for T1 would be at or near the 0 hour lagged temperature index, which is where it is, given the highest R-Sq and lowest CV(RMSE).

Again, for the cooling energy data, the best model with the highest R-Sq and lowest CV(RMSE) coincides with the NTL calculated and plotted in FIG. 3.

These results show that the heating and cooling energy usage in T1 are directly related to the calculated NTL and the particular NTL for winter and summer, can be determined by examination of the thermal and electrical cooling energy usage figures alone.

Figure 8:
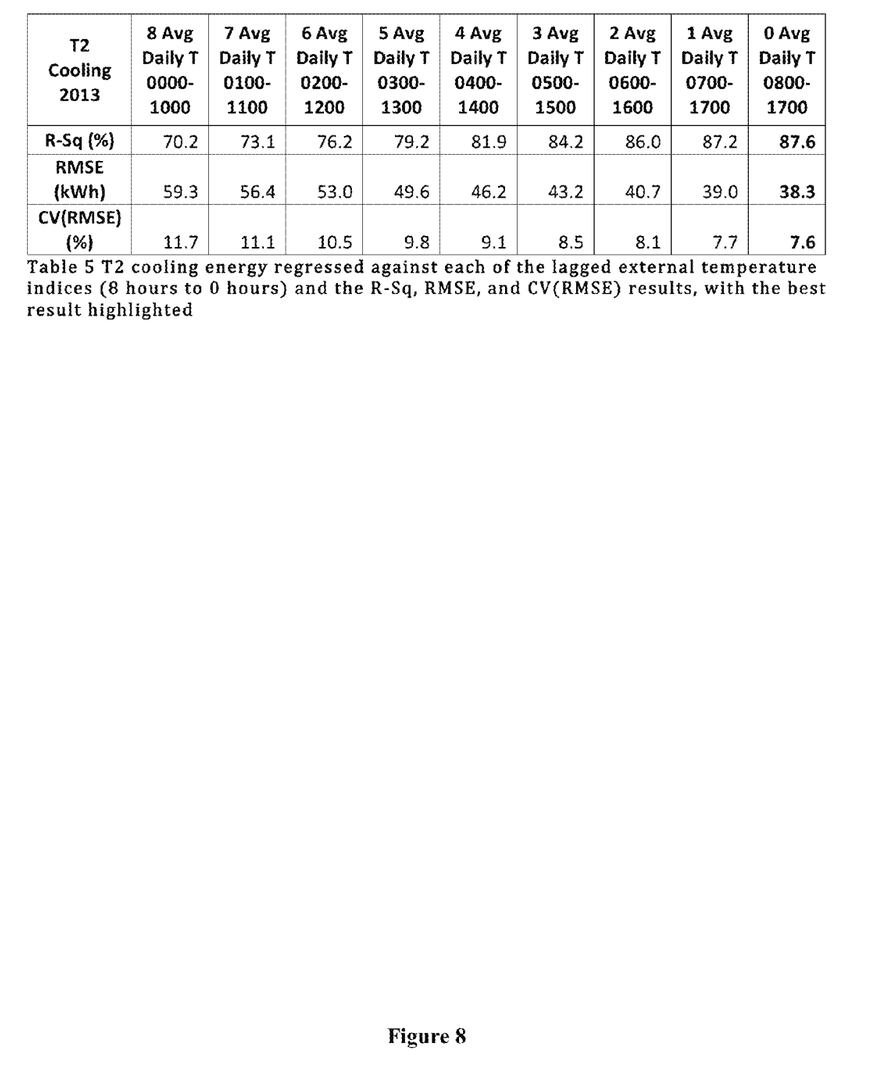
FIG. 8 shows Table 5 T2 cooling energy regressed against each of the lagged external temperature indices (8 hours to 0 hours) and the R-Sq, RMSE, and CV(RMSE) results, with the best result highlighted

Finally, the process was repeated on data from the test building T2. T2 is of similar construction as T1, being in the same development. The building is an enclosed shopping mall and the landlord's supply of cooling was examined. Landlord's heating is seldom required given occupancy levels and residual heat from the retail units. The following results were observed:

The T1 NTL was determined by the method outlined in U.S. application Ser. No. 13/906,822, and was shown to be under one hour throughout the year given the high percentage of roof glazing. With this value, it would be expected that the 0 hour lagged external temperature would provide the strongest predictor of cooling energy usage. The various lagged external temperature indices were generated and regressed against the cooling energy usage. The results are outlined in Table 5.

The strongest model was again found when the 0 hour lagged temperature index was used to predict cooling energy usage. This coincides with the data presented in U.S. application Ser. No. 13/906,822, for the T2 building.

An improved method of determining a building's unique NTL values for the heating and cooling seasons has been developed for a pilot building P1. This improved method has been applied to two test buildings, T1 and T2, to determine if the method can be accurately applied to determine the NTL values. In all three cases, the NTL values determined with the method developed in U.S. application Ser. No. 13/906,822, was confirmed by the new and improved method.

In all three cases, the improved method only uses the 15-minute interval energy usage data and the 15-minute interval external temperature data. This data is readily available from existing buildings, thereby making the improved method more useful in the determination of this important building thermal characteristic.

Summing up. The invention provides an improved method of determining the natural thermal lag of a building, where said method includes the steps of collecting and analysing building energy data and local external temperature data.

Using a processor for calculating, over a predetermined set of time increments, a series of up to nine statistical relationships between average hourly energy usage and nine lagged average temperature indices for said building. The nine regression relationships are averaged external temperatures over the working day with each index stepping back one hour in time.

According to the invention, the natural thermal lag can be derived by examination of the relationship between energy usage and external temperature for said building. The relationship is described by the following equation:

$$E_i = \beta_0 + \beta_1 E_i = \beta_0 + \beta_1 (LT_i)_{k=0.8} + \epsilon_i \qquad \text{Eqn 1}$$

where
$E_i$ represents the observed variable of average hourly thermal of electrical energy usage for said building on any chosen day,
$\beta_0$ represents the intercept of the linear relationship between energy and the lagged temperature average on the y or energy axis,
$\beta_1$ represents the slope of the relationship between average hourly energy usage and the lagged temperature average $(LT_i)_{k=0.8}$ for a same given day i and ranging over a period k from 0 to 8 hours prior to the building closing time,
$\epsilon$ represents the error inherent in the linear model.

The results of this series of regressions are shown in FIG. 2 for sample building P1. For any given building, the unique value of natural thermal lag (NTL) during the heating and cooling seasons, determined separately, can be determined by single linear regression of daily energy usage against the lagged average external temperature index which yields the most predictive regression model. Many buildings are heated by gas or oil and cooled by electricity and therefore the type of energy regressed against external temperature is dictated by the season under review.

This is an improvement over U.S. application Ser. No. 13/906,822, in that the said building's internal temperature interval data is no longer required and the NTL can be determined by use of readily available data from said building.

What is claimed is:

1. An improved computer implemented method of managing the energy usage of a commercial building particularly through inputs to a central processing unit of said building's management system, where said method includes collecting and analysing building data, identifying building energy reduction opportunities, characterizing said building, applying optimization process to management of said building, and monitoring building energy usage and reporting results, thereby enabling on-going building energy usage optimization, where, in the step of characterizing said building, said improvement comprises:
   determining a natural thermal lag of said building by
   a) using a processor for calculating,
      i) a plurality of statistical regression relationships between average hourly energy usage, calculated during building operating hours, and a plurality of lagged average temperature indices for said building and where said plurality of lagged average temperature indices are averaged external temperatures over a working day with each index stepping back one hour in time;
      ii) calculating a natural thermal lag of said building by examination of a relationship between energy usage and external temperature for said building, which relationship is described by $$E_i = \beta_0 + \beta_1 (LT_i)_{k=0.8} + \epsilon_i$$

where
      $E_i$ represents average hourly energy usage for said building on a day i,
      $\beta_0$ represents a Y axis intercept of a linear relationship between energy and lagged temperature average,
      $\beta_1$ represents a slope of a relationship between average hourly energy usage and a lagged temperature average $(LT_i)_{k=0.8}$ for a day i and ranging over a period k from 0 to 8 hours prior to a building closing time,
      $\epsilon$ is estimated variation;
   b) using said natural thermal lag of said building to calculate a mechanical cool down time of said building, where said mechanical cool down is a time period over which said building cools after said building's cooling pumps are started by said building management system; and
   c) outputting said mechanical cool down time to said building's energy management system, which system commands a plurality of chilling pumps and, in response to said mechanical cool down time, adjusts said chilling pumps speeds, enabling improved control of said building's cooling system operation in response to external weather parameters without internal building temperature data and thereby improving management of building energy usage.

* * * * *